US009905961B2

(12) United States Patent
Krijgsman

(10) Patent No.: US 9,905,961 B2
(45) Date of Patent: Feb. 27, 2018

(54) FINE PITCH CONNECTOR SOCKET

(71) Applicant: DSM IP ASSETS B.V., Heerlen (NL)

(72) Inventor: Josien Krijgsman, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 15/104,829

(22) PCT Filed: Dec. 18, 2014

(86) PCT No.: PCT/EP2014/078446
§ 371 (c)(1),
(2) Date: Jun. 15, 2016

(87) PCT Pub. No.: WO2015/091786
PCT Pub. Date: Jun. 25, 2015

(65) Prior Publication Data
US 2016/0322738 A1    Nov. 3, 2016

(30) Foreign Application Priority Data

Dec. 20, 2013 (EP) ..................................... 13199001

(51) Int. Cl.
| | | |
|---|---|---|
| *C08L 77/06* | (2006.01) | |
| *H01R 13/527* | (2006.01) | |
| *H01B 3/30* | (2006.01) | |
| *H01B 3/47* | (2006.01) | |

(52) U.S. Cl.
CPC ............ *H01R 13/527* (2013.01); *C08L 77/06* (2013.01); *H01B 3/305* (2013.01); *H01B 3/47* (2013.01)

(58) Field of Classification Search
CPC ........ H01R 13/527; H01B 3/47; H01B 3/305; C08L 77/06
See application file for complete search history.

(56) References Cited

U.S. PATENT DOCUMENTS

| 6,270,560 B1 | 8/2001 | Kleiner et al. | |
| 2009/0186971 A1* | 7/2009 | Grant | ............... C08J 5/18 |
| | | | 524/300 |
| 2010/0261818 A1 | 10/2010 | Seki | |
| 2011/0105655 A1 | 5/2011 | Harder et al. | |
| 2011/0257313 A1* | 10/2011 | Seki | ............... C08L 77/00 |
| | | | 524/126 |
| 2013/0122758 A1 | 5/2013 | Kim et al. | |

FOREIGN PATENT DOCUMENTS

| WO | WO 2005/033192 | 4/2005 |
| WO | WO 2009/012936 | 1/2009 |

OTHER PUBLICATIONS

Ebewele, R.O.; Polymer Science and Technology, 2000, p. 111.*
International Search Report for PCT/EP2014/078446, dated Mar. 31, 2015, 4 pages.
Written Opinion of the ISA for PCT/EP2014/078446, dated Mar. 31, 2015, 8 pages.
"If safety and environmental compatibility is precious to you—EXOLIT Flame Retardants for Thermoplastics", Clariant International Ltd, Jun. 12, 2013, 24 pages.

* cited by examiner

*Primary Examiner* — Robert Jones, Jr.
(74) *Attorney, Agent, or Firm* — Nixon & Vanderhye P.C.

(57) ABSTRACT

Fine pitch electrical connector socket, comprising at least two opposing walls between which a passageway is defined for receiving an insert with contact pins, the walls being formed from a fiber reinforced flame retardant thermoplastic polymer composition comprising a polyamide polymer, a flame retardant system and a fibrous reinforcing agent, wherein the polyamide polymer comprises at least a semi-crystalline polyamide (A) having a melting temperature Tm-A of at least 280° C., and optionally a second polyamide (B); the polyamide polymer has a crystallization enthalpy ΔHc of at least 50 J/g, the melting temperature Tm-A and crystallization enthalpy ΔHc being measured by DSC with the method according to ISO11357-1/3 with a heating and cooling rate of 20° C.; the flame retardant system comprises a combination of (C-1) a metal salt of dialkylphosphinate and/or diphosphinate and (C-2) a metal salt of phosphoric acid; and the composition has a heat distortion temperature of at least 265° C., measured according to ISO 75-1/2.

13 Claims, No Drawings

FINE PITCH CONNECTOR SOCKET

This application is the U.S. national phase of International Application No. PCT/EP2014/078446 filed 18 Dec. 2014, which designated the U.S. and claims priority to EP Patent Application No. 13199001.2 filed 20 Dec. 2013, the entire contents of each of which are hereby incorporated by reference.

The present invention relates to a fine pitch connector socket, more particular to a socket comprising at least two opposing walls between which a passageway is defined for receiving an insert with contact pins, wherein the walls have, the walls being formed from a fiber reinforced flame retardant thermoplastic polymer composition comprising a polyamide polymer, a flame retardant system and a fibrous reinforcing agent.

The E&E industry is characterized by a steady trend towards miniaturization leading to smaller connectors. This trend is now going towards fine pitch electrical connector sockets, such as DDR4 connectors, wherein the pitch distances are small and walls have a small thickness as well, e.g. of about 500 micrometers ($\mu m$) or less.

Electrical connectors are often employed to detachably mount a central processing unit ("CPU") to a printed circuit board. The connector may contain, for example, an injection molded socket, or housing, that is formed from a thermoplastic resin. Recent demands on the electronic industry have dictated an increase in the scale of a CPU circuit, which in turn dictates an increase in the number of contact pins used for connection. To help accomplish the desired performance, the pitch of these pins has generally decreased to accommodate the larger number of contact pins required within a given space. Electrical connectors must therefore also include insertion passageways corresponding to each of these fine pitch contact pins. As the pitch of the contact pins decreases, the pitch of the pin insertion passageways and the width of the opposing walls that partition those passageways must also decrease. Unfortunately, it is often difficult to adequately fill a mold of such a thin width with a thermoplastic resin. Further, mechanical strength may also become problematic.

Materials widely employed in sockets for electronic applications include high temperature polyamides and LCPs. LCPs are intrinsically more flame retardant than polyamides, and also better flowing than polyamides, which latter require higher loads of flame retardants as well as reinforcing agent for mechanical properties. LCPs are the material of choice for connectors with long form factors, such a DDR, SODIMM, PCI, etc. Such a housing is described in US-2013/0122758-A1. This patent application relates to a fine pitch connector made of a thermoplastic composition comprising a thermotropic liquid crystalline polymer and fibers of specified length. The thermotropic liquid crystalline polymer may be selected from different polymers, but is typically an aromatic polyester or polyesteramide, made from components comprising at least one aromatic hydroxyl-carboxylic acid.

A problem that has been observed with flame retardant polyamides when used in fine pitch connector sockets is not only that it is more difficult to fill the molds to produce the sockets, but also that either the mechanical properties during the pin insertion process are not OK, and/or that upon (reflow) soldering the side walls of the DDR connector tilt towards the center of the connector, hence a much higher pressure would be required to insert and take out the memory module. This can damage either the module or the socket.

A problem with connectors with small dimensions is that materials that are used lead to cracking during pin insertion, insufficient pin retention force, warpage or wall collapse, or a combination thereof. The problem of wall collapse is not unique for fine pitch connectors, and is already reported for connectors, such as rigid connector blocks, in U.S. Pat. No. 3,993,396. However, with fine pitch connectors, wall collapse is even a more critical problem. These problems typically occur or become more emphasized when the connectors go through a temperature cycle, such as applied during soldering for surface mounting of the connector on other parts. Warpage, or warp or twist of the connector socket, will lead to stresses in the surface mounted assembly, while wall collapse will lead to problems with insertion and removal cycle of the insert. Increasing the fiber reinforcement content, thereby increasing the stiffness does not always solve the problem of wall collapse, moreover, in combination with the presence of flame retardant, which has to be present in a sufficiently high amount to comply with flame retardancy requirements as well, the molding problems and warpage increase. Measures to reduce molding and warpage problems lead to increased wall collapse.

In view of the trend of miniaturization and the problems described above, there is a need for fine pitch electrical connector sockets that show less problems.

The aim of the present invention is therefore to provide a thin pitch connector that has no problems with pin insertion before reflow soldering as well as less warpage and thereby less problems with pin insertion after reflow soldering.

This aim has been achieved with the fine pitch connector socket according to the invention, with opposing walls being formed from a fiber reinforced flame retardant thermoplastic polymer composition comprising a polyamide polymer, a flame retardant system and a fibrous reinforcing agent, wherein the polyamide polymer comprises at least a semi-crystalline polyamide (A) having a melting temperature Tm-A of at least 280° C., and optionally a second polyamide (B);

the flame retardant system comprises a combination of (C-1) a metal salt of dialkylphosphinate and/or diphosphinate and (C-2) a metal salt of phosphoric acid, wherein (C-1) and (C-2) are present in a combined amount of 5-35 wt. %, relative to the total weight of the composition and in a weight ratio C-1/C-2 in the range of 95/5-55/45; and the composition has a heat distortion temperature of at least 265° C., measured according to ISO 75-1/2.

The effect of the fine pitch connector socket according to the invention, with opposing walls being formed from the said composition is that pin insertion can be done without damaging the socket and wall collapse upon reflow soldering is reduced thereby showing less problems with pin insertion after reflow soldering as well. The absence of cracking and reduced wall collapse also results in a good insertion and removal cycle of the insert, and allows for sufficient pin retention force.

Thin pitch connector sockets typically have opposing walls, i.e. wall in the length direction of the socket, with a thickness of less than 1 mm. Suitably, the thickness of the opposing walls in the socket according to the invention is about 800 micrometers ($\mu m$) or less, more particular about 500 $\mu m$ or less The thin pitch connector sockets suitably also have intersecting walls, i.e. walls dividing the passageway and separating the contact pins. The intersecting walls typically have a thickness of less than 500 micrometers ($\mu m$). Suitably, the thickness of the intersecting walls in the socket according to the invention is about 300 µm or less, more particular of about 200 micrometers (µm) or less.

An example of a thin pitch connector is a DDR4 connector. The socket according to the invention can be, for example, a socket for a DDR4 connector.

The semi-crystalline polyamide (A) has a melting temperature Tm-A of at least 280° C. Herein the melting temperature Tm-A is measured by DSC with the method according to ISO11357-1/3 with a heating and cooling rate of 20° C. Herein a first heating cycle, a cooling cycle and a second heating cycle is applied, wherein in the first heating cycle the temperature is raised to about 35° C. above Tm-A, kept at that temperature for 3 minutes, in the cooling cycle the temperature is cooled to 0° C., kept for 5 minutes at that temperature and then the second heating cycle is started. For the melting temperature Tm the peak value of the melting peak in the second heating cycle was determined.

The polyamide polymer shall further have a crystallization enthalpy ΔHc of at least 50 J/g. Herein the crystallization enthalpy ΔHc is also measured by DSC with the method as described above. For the crystallization enthalpy ΔHc the surface under the crystallization endotherm peak in the cooling cycle from 20° C. above Tm-A to 200° C. is determined and expressed in J/g relative to the weight of the composition. The resulting value is than corrected for the percentage of polyamide polymer in the composition.

The polyamide polymer in the composition may comprise next to the semi-crystalline polyamide (A) one or more other polyamides, together referred to as polyamide (B).

The polyamides that can be used for polyamide (A) and polyamide (B) can be selected from regular polyamides used for thermoplastic polyamide molding compositions generally known in the art.

Suitable polyamides that can be used for polyamide (A) are polyamide 46 (PA 46), and semi-aromatic polyamides with a melting temperature of at least 280° C. The semi-aromatic polyamide can be a copolyamide, such as PA 8T, PA 9T and PA 10T and copolymers such as PA XT/ZY. Herein T represents terephthalic acid; X and Z represent a diamine; and Y represents a dicarboxylic acid, which can be, for example, adipic acid, isophthalic acid, or terephthalic acid, or a combination thereof. X and Z are different when Y is terephthalic acid. X and Z can be the same or different when Y is not terephthalic acid. Examples of suitable semi-aromatic polyamides are PA 4T/6T/66, PA6T/66, PA6T/8T, PA6T/M5T, PA10T/6T, PA10T/610, and any copolyamides thereof, etc.

Suitable polyamides that can be used for polyamide (B) are amorphous semi-aromatic polyamides such as PA 6I/6T, and semi-crystalline aliphatic polyamides, such as PA 46, PA 66 and PA 6.

Polyamide (B) may be composed of different polyamides and may be an amorphous polyamide, or multiple amorphous polyamides, or a semi-crystalline polyamide, or multiple semi-crystalline polyamides, or any combination thereof. A semi-crystalline polyamide is herein understood to be a polyamide having a glass transition temperature (Tg) and a melting temperature (Tm), while an amorphous polyamide is herein understood to be a polyamide having a glass transition temperature (Tg) but not a melting temperature (Tm). When the second polyamide (B) is or comprises a semi-crystalline polyamide, having a melting temperature Tm-B, it shall have a melting temperature equal to or lower than Tm-A, preferably lower than Tm-A. In other words, when the composition comprises two or more semi-crystalline polyamides, the semi-crystalline polyamide with the highest melting point is considered to correspond to polyamide (A), and the other or others to polyamide (B).

In case the composition comprises a second semi-crystalline polyamide, in other words polyamide (B) consists of or comprises a semi-crystalline polyamide. The crystallization enthalpy of this polyamide is included in the crystallization enthalpy ΔHc, in the way as described for the measurement as described above.

Polyamide (A) suitably is a semi-crystalline semi-aromatic polyamide or a semi-crystalline aliphatic polyamide.

The composition advantageously comprises a second or further polyamides as polyamide (B), such as lower melting semi-crystalline semi-aromatic polyamide or a lower melting semi-crystalline aliphatic polyamide or an amorphous semi-aromatic polyamide. An advantage is that the molding behavior of the composition is improved and the production of the socket is less complicated.

In one preferred embodiment, the polyamide (B) comprises a amorphous semi-aromatic polyamide. This has the advantage that the molding behavior is further enhanced.

The semi-crystalline polyamide, comprised by or making up for polyamide (B) has a melting temperature below Tm-A. The melting temperature may well be equal to or above 280° C., for example about 290° C., but preferably is less than 280° C., more preferably below 270° C. Suitably, that melting temperature is, for example, about 260° C., or about 240° C. or about 220° C. The advantage of a lower melting temperature for the semi-crystalline polyamide as polyamide (B) or being part of polyamide (B) is that the molding behavior is also further enhanced.

These second or further polyamides may well have a molecular weight as high as polyamide (A), but preferably have a molecular weight that is lower than polyamide (A). In a preferred embodiment, polyamide (B) comprises a polyamide with a weight average molecular weight (Mw) of at most 7,500 dalton, more preferably at most 5,000 dalton. The advantage thereof is that the molding behavior is also further enhanced. Preferably the low molecular weight polyamide is a PA 46 prepolymer. The advantage is that molding behavior is improved while pin retention force is retained and soldering process can be carried out at higher temperature without occurrence of wall collapse.

The lower weight average molecular weight is suitably combined with an amorphous semi-aromatic polyamide, or with a lower melting semi-crystalline aliphatic polyamide, thereby even further improving the molding behavior.

Polyamide (B) may be present in a variable amount, thereby optimizing molding properties and other properties. However, in order to retain the advantages of the socket according to the present invention, the amount of polyamide (B) has to be restricted such that the requirements for the crystallization enthalpy and the HDT-A are complied with. Suitably, polyamide (A) and polyamide (B) are present in a weight ratio NB in the range of 100/0-50/50. Preferably, when polyamide (B) is present at all, the ratio NB is in the range of 95/5-70/30, more preferably 90/10-60/40.

The polyamide polymer in the composition is suitably present in an amount in the range of 30-80 wt. %, relative to the total weight of the composition. More particular the amount is in the range of 35-70 weight %, e.g. about 40 wt. %, about 50 wt. % or about 60 wt. %. A higher amount of polymer allows for better molding behavior while a lower amount allows for a higher amount of reinforcing agent and flame retardant and likewise for better mechanical properties and better flame retardancy properties.

The composition also comprises a fibrous reinforcing agent and a flame retardant system.

The fibrous reinforcing agent may be selected from standard materials used in thermoplastic molding compositions. Preferably, for the fibrous reinforcing agent, glass fibers are used. The fibrous reinforcing agent is suitably present in an amount in the range of 5-50 wt. %, and preferably 10-40 wt. %, for example about 20 wt. %, about 27.5 wt. % or about 35 wt. %. Herein the weight percentage (wt. %), is relative to the total weight of the composition.

The flame retardant system used in the present invention comprises a combination of (C-1) a metal salt of a dialkylphosphinate and/or a diphosphinate and (C-2) a metal salt of phosphoric acid.

The components (C-1) and (C-2) are suitably present in a ratio (C-1)/(C-2) in the range of 55/45-95/5, for example about 60/40, about 75/25 or about 90/10. Preferably the ratio (C-1)/(C-2) is in the range of 65/35-90/10.

(C-1) is herein a dialkylphosphinic salt of the formula (I), a diphosphinic salt of the formula (II), or polymers thereof and/or mixtures thereof

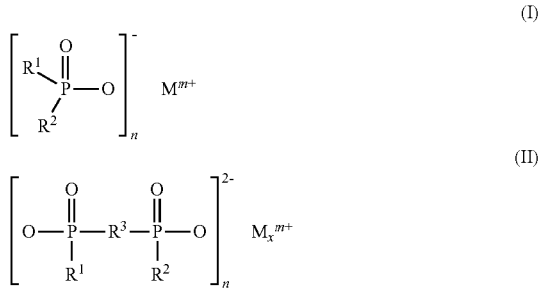

wherein $R^1$, $R^2$ are the same or different and are each linear or branched $C_1$-$C_6$-alkyl; $R^3$ is linear or branched $C_1$-$C_{10}$-alkylene, $C_6$-$C_{10}$-arylene, $C_7$-$C_{20}$-alkylarylene or $C_7$-$C_{20}$-arylalkylene; M is Mg, Ca, Al, Sb, Sn, Ge, Ti, Zn, Fe, Zr, Ce, Bi, Sr, Mn, Li, Na, K, a protonated nitrogen base or a mixture thereof; m is 1 to 4; n is 1 to 4; x is 1 to 4.

(C-2) is herein a salt of phosphorous acid of the formula (III)

wherein M is Mg, Ca, Al, Sb, Sn, Ge, Ti, Zn, Fe, Zr, Ce, Bi, Sr, Mn, Li, Na, K or a mixture thereof; m is 1 to 4.

Preferably, the metal M in the phosphinate and/or the phosphate is aluminum (Al) or zinc (Zn), preferably Al.

Examples of suitable flame retardant components (C-1) and (C-2) are aluminium diethyl phosphinate (DEPAL), respectively aluminium phosphate (PHOPAL: (HPO3)3Al2) and zinc phosphate ((HPO3)Zn). More preferably, components (C-1) and (C-2) are aluminium diethyl phosphinate and aluminium phosphate The components (C-1) and (C-2) are suitably present in a combined amount in the range of 5-35 wt. %, preferably 6-25 wt. %, relative to the total weight of the composition. More particular the combined amount is in the range of 8-22 wt. %, relative to the total weight of the composition.

The composition may comprise at least one other or further components or additives. These further components are suitably selected from auxiliary components and additives used in thermoplastic molding compositions for high temperature applications, such as flame retardant synergists, fillers, pigments, stabilizers and processing aids such as mold release agents.

Suitable the flame retardant synergist comprises a nitrogen-containing synergist, a phosphorus/nitrogen flame retardant or a mixture thereof, or a metal oxide or salt thereof.

These further components if present at all, may be present in different amounts varying over a broader or narrower range. Additives such as flame retardant synergists and fillers, may well be used in a combined amount in the range of 0-20 wt. %, though preferably, if used at all, in the range of 1-10 wt. %. Additives such as pigments, stabilizers and processing aids are typically used in lower amounts, with a combined amount in the range of for example 0-10 wt. %, though preferably, if used at all, in the range of 0.1-5 wt. %.

The composition in the socket according to the invention suitably comprises, next the polyamide (A), optional polyamide (B), the fibrous reinforcing agent and the flame retardant components (C-1) and (C-2), one or more further component, where these further component or components are present in a combined amount of at most 20 wt. %, preferably at most 10 wt. %. More preferred, the composition comprises 0-5 wt. % of one or more further component. Herein the weight percentage (wt. %), is relative to the total weight of the composition.

In a preferred embodiment of the present invention, the composition in the socket has a heat distortion temperature HDT-A of at least 270° C., more preferably at least 280° C. The advantage is that for the reflow soldering process a higher temperature can be applied without occurrence of wall collapse.

In another preferred embodiment, the socket is made of a composition having a stiffness of at least 10,000 MPa, more preferably at least 11,000 MPa. Herein the stiffness is measured with the method according to ISO 527-1/2 at 20° C. The advantage is that the pin retention force will be higher.

In a further preferred embodiment, the composition has a melt flow length of at least 120 mm, more preferably at least 140 mm. The melt flow length is herein measured by a spiral flow test in a spiral cavity with dimensions 280×15×1 mm at a temperature of 20° C. above Tm-A. The advantage is the molding behavior is better.

The above embodiments are suitably combined. Herein, it is to be realized that increasing the HDT-A and stiffness by increasing the content in fibrous reinforcing agent may jeopardize the molding properties, whereas increase in flow behavior through lowering the molecular weight of polyamide (A) and for increasing the amount of polyamide (B) may jeopardize HDT-A, the stiffness and/or crystallization enthalpy.

The socket according to the present invention has thin walls, and may be used in applications wherein the composition has to comply with strict safety requirements. Therefore the composition used in the socket preferably has a flame retardancy rating, measured according to UL-94 standards, of V-0 at 0.8 mm, more preferably a V-0 rating at 0.4 mm, even more preferred V-0 at 0.18 mm. Such high ratings can be achieved with the socket according to the invention in particular, wherein polyamide (A) in the composition is a semi-crystalline semi-aromatic polyamide, and polyamide (B), if present preferably comprises an amorphous semi-aromatic polyamide. Meanwhile the advantageous effects on pin retention and reduced wall collapse are retained.

In a preferred embodiment, the composition of which the socket is made comprises the components in the following amounts:
- 30-80 wt. % of the polyamide polymer
- 6-25 wt. % of a combined amount of (C-1) and (C-2)
- 10-40 wt. % of the fibrous reinforcing agent.

In a particular embodiment, the composition consists of:
- 30-60 wt. % of polyamide polymer, consisting of polyamide (A) and optionally polyamide (B), present in a weight ratio (A)/(B) in the range of 50/50-100/0;
- 8-22 wt. % of a combined amount of (C-1) and (C-2), present in a weight ratio (C-1)/(C-2) in the range of 95/5-55/45;
- 10-40 wt. % of the fibrous reinforcing agent; and
- 0-20 wt. % of at least one further component.

The invention is further illustrated with the following examples and comparative experiments.

EXPERIMENTAL PART

Materials.

The following materials were used:
A-1 PA 46; regular grade for thermoplastic molding compositions, Tm 295° C.
A-2 PA4T/66 copolyamide; low molecular weight grade for thermoplastic molding compositions, Tm 325° C.
A-3 PA4T/66 copolyamide; regular molecular weight grade for thermoplastic molding compositions, Tm 325° C.
A-4 PA10T/6T, "high" melting grade for thermoplastic molding compositions, Tm 300° C.
A-5 PA10T/6T, "low" melting grade for thermoplastic molding compositions, Tm 290° C.
A-6 PA 66, regular grade for thermoplastic molding compositions, Tm 260° C.
B-1 PA 46; polyamide prepolymer, Tm 290° C.
B-2 PA 46, identical to A-1.
B-3 PA 6I/6T; amorphous semi-aromatic polyamide
B-4 Polyamide 6, aliphatic polyamide; Tm 220° C.
B-4 PA 410; aliphatic polyamide; Tm 245° C.
C-1 Exolit OP1400, mixture of about 80% OP1230 (aluminium phosphinate) and about 20% PHOPHAL (aluminium phosphate), ex Clariant
C-2 Exolit OP 1230, (aluminium phosphinate), ex Clariant
C-3 Exolit OP 1311, ex Clariant
C-4 Mixture of melam and OP1230 (aluminium phosphinate); weight ratio 83/17
C-5 Mixture of OP1230 and ZnHPO3; weight ratio 75/25
C-6 Mixture of OP1230 and ZnHPO3; weight ratio 60/40
C-7 Mixture of OP1230 and ZnHPO3; weight ratio 50/50
C-8 Mixture of OP1230 and FP-300; weight ratio 80/20
FP-300 is a Cyano-modified cyclic phenoxy phosphazene compound; available under the tradename RABITLE FP-300 from Fushimi Pharmaceutical Co., Ltd
PA-6 masterbatch Pigment master batch (20 wt. %) in PA-6
GF Glass fibers: standard grade for thermoplastic polyamide molding compositions.
MRA/Stabilizer Standard package of mold release agent and stabilizer Compositions Injection molding compositions were prepared on a double screw extruder using a standard processing conditions.

Injection Molding

The materials where used in injection molding using a single screw extruder equipped with an appropriate mold for the production of DDR 4 sockets.

Lead Free Soldering on a HFFR PCB

The sockets were used for the production of an electronic assembly by lead free soldering of the sockets on PCB using a standard lead free soldering process with a peak temperature of 250° C.

Test Bars

For the flame retardancy and the mechanical properties appropriate test bars complying with the corresponding test methods were prepared.

Methods

Flame Retardancy

The flame retardancy was tested according to UL-94-V at a sample thickness of 0.8 mm and 0.4 mm.

Thermal Properties

The melting temperatures (Tm) and the crystallization enthalpies ($\Delta Hc$) were measured by DSC with the method according to ISO 11357-1/-3, as described herein further above.

Heat Deflection Temperature.

The Heat deflection temperature was measured according to ISO 75-1/-2, applying the conditions for HDT-A.

Mechanical Properties

The stiffness was measured at 20° C. according to ISO 527-1/-2 (MPa).

Flow Properties

The flow properties of the compositions were measured by measuring the flow length in a spiral flow test on an injection molding set-up comprising a single screw extruder equipped with a spiral cavity with dimensions 280×15×1 mm with a temperature setting of the melt in the extruder at a temperature 20° C. above the melt temperature of polymer (A), under an effective injection pressure of 100 MPa.

The compositions of the different materials, their properties and test results with the sockets have been collected in Table 1; part 1 with Examples I-X according to the invention and part 2 with comparative experiments A-J.

Comparative experiment J (CE-J), comprising a metal phosphinate/phosphazene combination in PA46 showed extensive foaming and strand instability during compounding; it was possible to produce parts for UL testing only with difficulty. Molding tests for preparing samples for mechanical testing and injection molding for the production of DDR 4 sockets was not possible.

TABLE 1

Part 1: Examples I-VIII; Part 2: Comparative experiments

| Composition (type; wt. %) | Examples (EX) | | | | | | | | | | |
|---|---|---|---|---|---|---|---|---|---|---|---|
| | EX-I | EX-II | EX-I | EX-IV | EX-V | EX-VIII | EX-VI | EX-VII | EX-VIII | EX-IX | EX-X |
| PA-A | A-1 | A-1 | A-1 | A-2 | A-3 | A-3 | A-3 | A-3 | A-4 | A-4 | A-4 |
| | 37.8 | 31.4 | 28.4 | 58 | 49.4 | 40.6 | 42 | 40 | 46.4 | 48 | 48 |
| PA-B | | B-1 | 4% B-1 | | B-1 | B-2 | B-5 | B-5 | | | |
| | | | 9% B-3 | 4% B-1 11% B-4 | | | | | | | |

TABLE 1-continued

Part 1: Examples I-VIII; Part 2: Comparative experiments

| | | | | | | | | | | | |
|---|---|---|---|---|---|---|---|---|---|---|---|
| (total amount PA-B in wt. %) | 6.6 | 13 | 15 | | 6 | 17.4 | 14 | 13 | | | |
| PA 6 masterbatch | | 4 | | | 2 | | 2 | 2 | | | |
| FR = EX-I-EX-XIII all C-1 | C-1 | C-1 | C-1 | C-1 | C-1 | C-1 | C-1 | C-1 | C-1 | C-5 | C-6 |
| FR = EX-I-EX-XIII all C-1 | 20 | 20 | 16 | 12 | 12 | 12 | 12 | 15 | 15 | 22 | 22 |
| GF | 35 | 35 | 40 | 30 | 30 | 30 | 30 | 30 | 33 | 30 | 30 |
| MRA, Stabilizer | 0.6 | 0.6 | 0.6 | | | | | | 0.6 | | |
| Properties | | | | | | | | | | | |
| UL-94-V0 rating at 0.8 mm | Pass | Pass | Pass | Pass | Pass | Pass | Pass | Pass | Pass | Pass | Pass |
| UL-94-V0 rating at 0.4 mm | Pass | Pass | No | Pass | Pass | Pass | Pass | Pass | Pass | Pass | No |
| ΔHc composition (J/g) | 41 | 30 | 32 | 38 | 34 | 34 | 31 | 30 | 24 | 43 | 42 |
| Wt. % polymer | 44.4 | 44.4 | 43.4 | 58 | 58 | 58 | 58 | 55 | 46.4 | 48 | 48 |
| ΔHc polymer (J/g) | 92 | 68 | 74 | 66 | 59 | 59 | 53 | 55 | 57 | 90 | 88 |
| Tm (° C.) | 295 | 282 | 282 | 325 | 317 | 317 | 309 | 306 | 300 | 293 | 294 |
| HDT-A (° C.) | 290 | 275 | 275 | 305 | 295 | 295 | 288 | 290 | 270 | 290 | 290 |
| Stiffness (MPa) | 11500 | 12300 | 13500 | 12000 | 11000 | 11000 | 11500 | 11500 | 10500 | 10100 | 10250 |
| Flow length | 180 | 145 | 145 | 130 | 145 | 145 | 170 | Not meas. | Not meas. | Not meas. | Not meas. |
| Molding Results (rating) | | | | | | | | | | | |
| Wall collapse | OK | OK | OK | OK | OK | OK | OK | OK | JustOK | OK | OK |
| Pin insertion (OK or damaged?) | OK | OK | OK | OK | OK | OK | OK | OK | OK | OK | OK |

| | Comparative Experiments (CE) | | | | | | | | | |
|---|---|---|---|---|---|---|---|---|---|---|
| | CE-A | CE-B | CE-C | CE-D | CE-E | CE-F | CE-G | CE-H | CE-I | CE-J |
| Composition (type; wt. %) | | | | | | | | | | |
| PA-A | A-1 | A-3 | A-3 | A-4 | A-5 | A-5 | A-6 | A-6 | A-6 | A-6 |
| | 33.4 | 37 | 28 | 43.4 | 40.4 | 41.4 | 49.4 | 49.4 | 48 | 48 |
| PA-B | B-1 | B-5 | B-5 | | | B-3 | | | | |
| | 4 | 19 | 28 | | | 8 | | | | |
| PA 6 masterbatch | 2 | 2 | 2 | | | 2 | | | | |
| FR | C-4 | C-1 | C-1 | C-2 | C-2 | C-1 | C-3 | C-1 | C-7 | C-8 |
| | 30 | 12 | 12 | 26 | 26 | 15 | 20 | 20 | 22 | 22 |
| GF | 30 | 30 | 30 | 30 | 33 | 33 | 30 | 30 | 30 | 30 |
| MRA, Stabilizer | 0.6 | | | 0.6 | 0.6 | 0.6 | 0.6 | 0.6 | | |
| Properties plus Method and unit) | | | | | | | | | | |
| UL-94-V0 rating at 0.8 mm | Pass | Pass | Pass | Pass | Pass | Pass | Pass | Pass | No | No |
| UL-94-V0 rating at 0.8 mm | No | No | No | Pass | Pass | Pass | Pass | Pass | No | No |
| ΔHc composition (J/g) | 32 | 28 | 21 | 26 | 24 | 25 | | | 43 | |
| Wt. % polymer | 39 | 58 | 58 | 43.4 | 40.4 | 51.4 | 49.4 | 49.4 | 48 | a) |
| ΔHc polymer (J/g) | 81 | 48 | 36 | 60 | 59 | 49 | | | 90 | a) |
| Tm (° C.) | 295 | 306 | 305 | 300 | 290 | 290 | 260 | 260 | 295 | a) |
| HDT-A (° C.) | 290 | 280 | 265 | 270 | 260 | 260 | 250 | 250 | 290 | a) |
| Stiffness (MPa) | 12500 | 11500 | 11500 | 9500 | 10500 | 10500 | 11000 | 11000 | 10500 | a) |
| Flow length | 160 | | | 140 | 160 | 160 | 90 | 90 | 90 | a) |
| Molding results (rating) | | | | | | | | | | |
| Wall collapse | Not tested | Not OK | Not OK | Not OK | Not OK | Not OK | Not OK | Not OK | Not tested | Not tested |
| Pin insertion (OK or damaged?) | Not OK # | OK | OK | Just OK * | Just OK * | OK | OK | OK | Not tested | Not tested |

* borderline;
too brittle;
a) see comments above.

The invention claimed is:

1. A fine pitch electrical connector socket comprising:
at least two opposing walls having a thickness of less than 1 mm, and
a passageway defined between the opposing walls for receiving an insert with contact pins, wherein
the opposing walls are formed from a fiber reinforced flame retardant thermoplastic polymer composition comprising a polyamide polymer, a flame retardant system and a fibrous reinforcing agent, and wherein
the polyamide polymer comprises at least a semi-crystalline polyamide (A) having a melting temperature Tm-A of at least 280° C., and optionally a second polyamide (B); and wherein
the polyamide polymer has a crystallization enthalpy ΔHc of at least 50 J/g, the melting temperature Tm-A and crystallization enthalpy ΔHc being measured by DSC with the method according to ISO11357-1/3 with a heating and cooling rate of 20° C.; and wherein
the flame retardant system comprises a combination of (C-1) a metal salt of dialkylphosphinate and/or diphosphinate and (C-2) a metal salt of phosphoric acid; wherein (C-1) and (C-2) are present in a combined amount of 5-35 wt. %, relative to the total weight of the composition and in a weight ratio C-1/C-2 in the range of 95/5-55/45; and wherein the composition has a heat distortion temperature of at least 265° C., measured according to ISO 75-1/2.

2. The socket according to claim 1, wherein the opposing walls have a thickness of about 500 micrometers (μm) or less.

3. The socket according to claim 1, wherein the socket has intersecting walls dividing the passageway and separating the contact pins, the intersecting wall having a thickness of less than 300 micrometers (μm) or less.

4. The socket according to claim 1, wherein the composition comprises a second polyamide (B) selected from the group consisting of amorphous semi-aromatic polyamides, aliphatic polyamides and combinations thereof.

5. The socket according to claim 1, wherein the second polyamide (B) is selected from the group consisting of aliphatic polyamides having a melting temperature of less than 270° C., aliphatic polyamides with a melting temperature of at least 270° C. and a weight average molecular weight Mw-B of at most 5,000 dalton and combinations thereof.

6. The socket according to claim 1, wherein polyamide (A) and polyamide (B) are present in a weight ratio A/B in a range of 100/0-50/50.

7. The socket according to claim 1, wherein (C-1) and (C-2) are present in a weight ratio in a range of 90/10-65/35.

8. The socket according to claim 1, wherein the composition comprises:
30-80 wt. % of the polyamide polymer;
6-25 wt. % of a combined amount of (C-1) and (C-2); and
10-40 wt. % of the fibrous reinforcing agent.

9. The socket according to claim 1, wherein the composition has a heat distortion temperature HDT-A of at least 270° C.

10. The socket according to claim 1, wherein the composition has a stiffness of at least 10,000 MPa, measured with the method according to ISO 527-1/2 at 20° C.

11. The socket according to claim 1, wherein the composition has a melt flow length of at least 120 mm, measured by a spiral flow test in a spiral cavity with dimensions 280×15×1 mm at a temperature of 20° C. above Tm-A.

12. The socket according to claim 1, wherein the composition has a flame retardancy rating, measured according to UL-94, of at least V-0 at 0.8 mm.

13. The socket according to claim 3, wherein the intersecting walls have a thickness of about 200 micrometers (μm) or less.

* * * * *